US012249437B2

(12) United States Patent
Larsen

(10) Patent No.: US 12,249,437 B2
(45) Date of Patent: Mar. 11, 2025

(54) PRODUCTION OF HIGHLY PURIFIED 212PB

(71) Applicant: Sciencons AS, Oslo (NO)

(72) Inventor: Roy H. Larsen, Oslo (NO)

(73) Assignee: Sciencons AS, Oslo (NO)

( * ) Notice: Subject to any disclaimer, the term of this patent is extended or adjusted under 35 U.S.C. 154(b) by 0 days.

(21) Appl. No.: 18/680,605

(22) Filed: May 31, 2024

(65) Prior Publication Data

US 2024/0395432 A1 Nov. 28, 2024

Related U.S. Application Data

(63) Continuation of application No. 17/756,802, filed as application No. PCT/EP2020/084701 on Dec. 4, 2020, now Pat. No. 12,125,603.

(30) Foreign Application Priority Data

Dec. 5, 2019 (EP) .................................... 19213759
Apr. 29, 2020 (EP) .................................... 20172038

(51) Int. Cl.
*G21G 1/00* (2006.01)
*G21F 5/015* (2006.01)
*G21F 5/018* (2006.01)

(52) U.S. Cl.
CPC ........... *G21G 1/0005* (2013.01); *G21F 5/015* (2013.01); *G21F 5/018* (2013.01)

(58) Field of Classification Search
CPC ........ G21G 1/0005; G21F 5/015; G21F 5/018
See application file for complete search history.

(56) References Cited

U.S. PATENT DOCUMENTS

| | | | |
|---|---|---|---|
| 3,453,196 A | 7/1969 | Sporek | |
| 5,038,046 A | 8/1991 | Norman et al. | |
| 7,476,370 B2 | 1/2009 | Mitsugashira et al. | |
| 8,329,122 B1 * | 12/2012 | Watrous | G21G 1/0005 423/2 |
| 9,202,600 B2 | 12/2015 | Ravn et al. | |
| 10,434,198 B2 | 10/2019 | Larsen | |
| 12,125,603 B2 | 10/2024 | Larsen | |
| 2006/0022127 A1 | 2/2006 | Zyuzin | |
| 2009/0162278 A1 | 6/2009 | Ravn et al. | |

(Continued)

FOREIGN PATENT DOCUMENTS

| | | |
|---|---|---|
| EP | 0 466 290 A1 | 1/1992 |
| RU | 2742138 C1 | 2/2021 |

OTHER PUBLICATIONS

Hassfjell, A 212Pb generator based on a 228Th source. Appl Radiat Isot. Oct. 2001;55(4):433-9. doi: 10.1016/s0969-8043(00)00372-9.

(Continued)

*Primary Examiner* — Sean M Luck
(74) *Attorney, Agent, or Firm* — Wolf, Greenfield & Sacks, P.C.

(57) ABSTRACT

The present invention relates to assemblies and method for obtaining a container comprising $^{212}Pb$ on the walls obtained from a $^{212}Pb$ precursor isotope source. The invention provides an improved system and method for producing $^{212}Pb$ in high purity without the need for processing, with high yields, and which safely and efficiently can be transported to the locations where it is to be used.

38 Claims, 5 Drawing Sheets

(56) References Cited

U.S. PATENT DOCUMENTS

| | | | |
|---|---|---|---|
| 2014/0186268 | A1 | 7/2014 | Vasiljeva et al. |
| 2015/0170776 | A1 | 6/2015 | Torgue et al. |
| 2018/0047474 | A1 | 2/2018 | O'Hara |
| 2023/0014219 | A1 | 1/2023 | Larsen |

OTHER PUBLICATIONS

International Search Report for PCT Application No. PCT/EP2020/084701 dated Feb. 17, 2021.

PCT/EP2020/084701, Feb. 17, 2021, International Search Report and Written Opinion.

Atcher et al., A radionuclide generator for the production of 211Pb and its daughters. J Radioanalyt Nucl Chem. Feb. 1989; 135:215-21.

Atcher et al., An improved generator for the production of 212Pb and 212Bi from 224Ra. Int J Rad Appl Instrum A. 1988;39(4):283-6. doi: 10.1016/0883-2889(88)90016-0.

Boldyrev et al., 212Pb/212Bi Generator for nuclear medicine. Atomic Energy. Mar. 2, 20123;111:422-7.

Chappell et al., Synthesis, characterization, and evaluation of a novel bifunctional chelating agent for the lead isotopes 203Pb and 212Pb. Nucl Med Biol. Jan. 2000;27(1):93-100. doi: 10.1016/s0969-8051(99)00086-4.

Hassfjell et al., A generator for production of 212Pb and 212Bi. Appl Radiat Isot. Oct. 1994;45(10):1021-5.

Knapp et al., Availability of Alpha-Emitting Radioisotopes by Reactor and Accelerator Production and via Decay of Naturally Occurring Parents. In: Radiopharmaceuticals for Therapy. 2016. Knapp et al., Eds. Chapter 8:159-66.

Kozempel, Radon Nuclides and Radon Generators. In: Radon. 2017. Adrovic, Ed. Chapter 2:7-23.

Rutherford, A radio-active substance emitted from thorium compounds. The London, Edinburgh, and Dublin Philosophical Magazine and Journal of Science. Jan. 1900;49(296):1-14.

Rutherford, The Succession of Changes in Radioactive Bodies. Phil Trans Roy Soc A. 1905;204:169-219.

Wrasidlo et al., Generation of lead-212 and radioimmunoconjugates for use in cancer therapy and the 'emanating power' of stearates. Coll Surf A Physiochem Eng Aspects. Jul. 3, 20011;186(1-2):123-8.

Stenberg et al., Preparation of the alpha-emitting prostate-specific membrane antigen targeted radioligand [212 Pb]Pb-NG001 for prostate cancer. J Labelled Comp Radiopharm. Mar. 2020;63(3):129-143. doi: 10.1002/jlcr.3825. Epub Jan. 29, 2020.

* cited by examiner

Open position

PRODUCTION OF HIGHLY PURIFIED 212PB

CROSS REFERENCE TO RELATED APPLICATIONS

This application is a Continuation of U.S. application Ser. No. 17/756,802, filed Jun. 2, 2022, which is a national stage filing under 35 U.S.C. § 371 of International Patent Application Serial No. PCT/EP2020/084701, filed Dec. 4, 2020. Foreign priority benefits are claimed under 35 U.S.C. § 119(a)-(d) or 35 U.S.C. § 365(b) of European application number 20172038.0, filed Apr. 29, 2020 and European application number 19213759.4, filed Dec. 5, 2019. The entire contents of these applications are incorporated herein by reference in their entirety.

FIELD

The present invention relates to a single chamber diffusion generator (assembly), assemblies and method for obtaining a container comprising $^{212}$Pb on the walls obtained from a $^{212}$Pb precursor isotope source. The invention provides an improved system and method for producing $^{212}$Pb in high purity without the need for processing, with high yields, and which safely and efficiently can be transported to the locations where it is to be used.

BACKGROUND

Assemblies for preparing or producing $^{212}$Pb have previously been described and based on $^{228}$Th bound to stearate in a chamber with another chamber for collecting the $^{212}$Pb after $^{220}$Rn has diffused from the first chamber (source chamber) to the second chamber (collector chamber).

In another system the $^{228}$Th/$^{224}$Ra was extracted from one vessel with a pump generated airflow and $^{220}$Rn/$^{212}$Pb collected in another vessel. The system consisted of an "air loop" for transportation of $^{220}$Rn and a "fluid loop" for $^{212}$Pb rinsing and after rinse collection. This is a quite complex system which is not suitable for shipment and handling, and the potential for leakage or inappropriate use in for example a hospital is significant.

In another system an emanator source is placed inside one chamber and a gas flow passes through and carry $^{220}$Rn to another chamber where $^{220}$Rn/$^{212}$Pb is collected. After some time, the carrier gas valve is closed, and the collection unit is added a liquid through a top valve and the liquid is collected through a bottom valve. This system is as well relatively complex. Both of these systems need significant work effort of skilled workers and relatively advanced lab equipment and space to operate.

Also, generator systems for $^{212}$Pb not relying on $^{220}$Rn emanation and diffusion has been presented previously. In one existing generator system $^{224}$Ra is bound to ion exchange material and the $^{212}$Pb extracted by elution with acid which must be evaporated before it can be used for radiolabeling in another existing system the $^{212}$Pb in a solution with $^{224}$Ra is used for labelling following the removal of $^{224}$Ra by size exclusion purification. Both these methods are working but requires extra time for processing, more so for the first method than the second. $^{212}$Pb has a half-life of only 10.6 h. This half-life makes the radioisotope idea for medical applications such as anti-cancer treatment because it acts on its target and without prolonged side effects from a long half-life. However, this feature also makes is difficult to use in a commercial setting involving centralized production and long-distance shipment to end users simply because it decays fast which gives lower yields over time.

Thus a challenge for the current emanation and diffusion systems is transport distances which can reduce efficiency significantly due to decay of $^{220}$Rn before reaching the collection vessels. For example, one system reported a total yield from a 3 day operation of 2.01 MBq $^{212}$Pb collected compared from a $^{228}$Th source of 7.05 MBq, i.e. less than 30% yield. Increasing the operation time did not increase the amount collected and the system was sensitive to the air flow rate.

There is a need for alpha-emitter therapeutics for biomedical applications. Lead-212 ($^{212}$Pb) is a beta-emitter that decays to short lived progenies producing alpha particles and can thus act as an alpha emitter generator in vivo useful in alpha emitter therapeutics.

This industry therefore needs an improved system and method for producing $^{212}$Pb in high purity without the need for processing, with high yields, and which safely and efficiently can be transported to the locations where it is to be used.

SUMMARY

An object of the present invention relates to a method for obtaining a container comprising $^{212}$Pb on the walls comprising the steps of providing an assembly comprising a first part and a second part, wherein the first part comprises a container and the second part comprises a $^{212}$Pb precursor isotope source, connecting the first part and the second part such that the $^{212}$Pb precursor isotope source does not come into contact with an inner wall of the container and such that a single chamber container assembly is provided, allowing the $^{212}$Pb precursor isotope source sufficient time to decay to progenies $^{220}$Rn, $^{216}$Po, or $^{212}$Pb, and sufficient time for $^{220}$Rn, $^{216}$Po and/or $^{212}$Pb to settle onto the inner walls of the single chamber container assembly, removing or isolating the remaining $^{212}$Pb precursor isotope from the single chamber assembly without having the $^{212}$Pb precursor isotope source come into contact with an inner wall of the single chamber container assembly, and obtaining a container comprising $^{212}$Pb on an inner wall of the container and substantially free of the $^{212}$Pb precursor isotope source on the inner wall of the container. The described system may be termed a single chamber diffusion generator for $^{212}$Pb.

In the following, precursor isotope is defined as a mother nuclide, grandmother nuclide, great grandmother nuclide etc. for $^{212}$Pb i.e., $^{216}$Po, $^{220}$Rn, $^{224}$Ra etc.

A further object of the present invention relates to an assembly comprising a first part and a second part, wherein the first part comprises a container and the second part comprises a $^{212}$Pb precursor isotope source, wherein the first part and the second part are connected such that the $^{212}$Pb precursor isotope source does not come into contact with an inner wall of the container, and such that a single chamber container assembly is provided.

Yet another object of the present invention relates to a single chamber container assembly comprising a first part and a second part, wherein the first part comprises a container and the second part comprises a $^{212}$Pb precursor isotope source, wherein the first part and the second part are connected such that the $^{212}$Pb precursor isotope source does not come into contact with an inner wall of the container.

In one or more embodiments of the invention the single chamber container assembly is gas tight.

In one or more embodiments of the invention the $^{212}Pb$ precursor isotope source is selected from the group consisting of $^{232}Th$, $^{228}Ra$, $^{228}Ac$, $^{228}Th$ and/or $^{224}Ra$.

In one or more embodiments of the invention the $^{212}Pb$ precursor isotope source is a mixture of $^{232}Th$, $^{228}Ra$, $^{228}Ac$, $^{228}Th$ and $^{224}Ra$.

In one or more embodiments of the invention the $^{212}Pb$ precursor isotope source is a mixture of $^{228}Th$ and $^{224}Ra$.

In one or more embodiments of the invention the $^{212}Pb$ precursor isotope source is $^{224}Ra$. In one or more embodiments of the invention the $^{212}Pb$ precursor isotope source is $^{228}Th$. The $^{212}Pb$ activity may vary from typically 0% to 114% of the $^{224}Ra$ precursor activity in the generator depending on the ingrowth status. The $^{212}Pb$ activity can be at least 90%, such as at least 80%, such as at least 70%, such as at least 60%, such as at least 50%, such as at least 40%, such as at least 30%, such as at least 20%, such as at least 10% of the $^{224}Ra$ precursor activity.

In one or more embodiments of the invention the $^{212}Pb$ precursor isotope source is $^{228}Th$ that has at least 90%, such as at least 80%, such as at least 70%, such as at least 60%, such as at least 50%, such as at least 40%, such as at least 30%, such as at least 20%, such as at least 10% $^{228}Th$ measured as % radioactivity relative to $^{212}Pb$.

In one or more embodiments of the invention the $^{212}Pb$ precursor isotope source is $^{224}Ra$ that has at least 90%, such as at least 80%, such as at least 70%, such as at least 60%, such as at least 50%, such as at least 40%, such as at least 30%, such as at least 20%, such as at least 10% $^{224}Ra$ measured as % radioactivity relative to $^{212}Pb$.

In one or more embodiments of the invention the total amount of radioactivity in the single chamber container assembly is 1 kBq-100 GBq.

In one or more embodiments of the invention the $^{212}Pb$ precursor isotope source is in the form of an inorganic or organic salt, such as $RaCl_2$.

In one or more embodiments of the invention the $^{212}Pb$ precursor isotope source is bound to a non-radioactive material, such as particles or a holding material.

In one or more embodiments of the invention the $^{212}Pb$ precursor isotope source is in a dry form or in a liquid solution, such as an aqueous solution or a dispersion.

In one or more embodiments of the invention the $^{212}Pb$ precursor isotope source is in a liquid solution that is at acidic, neutral or basic pH.

In one or more embodiments of the invention the $^{212}Pb$ precursor isotope source is deposited on a strip or sphere that is made of a material suitable for application of a liquid.

In one or more embodiments of the invention the $^{212}Pb$ precursor isotope source is deposited on a strip or sphere which is made of material that is selected from the group consisting of paper, plastic, metal, ceramic, and natural or synthetic fibers, cellulose.

In one or more embodiments of the invention a strip or sphere is attached to the second part, which comprises means for holding the strip or sphere, such as a rod.

In one or more embodiments of the invention the second part comprises a syringe, or wherein the rod is the syringe.

In one or more embodiments of the invention the syringe tip has been pushed through a rubber cap.

In one or more embodiments of the invention the second part comprises a rod that is attached to the means for opening and closing the container.

In one or more embodiments of the invention the means for opening and closing the container is a cap, cover or a lid.

In one or more embodiments of the invention the cap, cover or a lid is made of a material selected from the group consisting of rubber, glass, paper, plastic, metal, ceramic, and natural or synthetic fibers.

In one or more embodiments of the invention the $^{212}Pb$ precursor isotope source is placed on or in a sphere, suitable for holding the source but allowing radon diffusion.

In one or more embodiments of the invention the container comprises a gas permeable barrier impervious to the $^{212}Pb$ precursor isotope source.

In one or more embodiments of the invention the gas permeable barrier impervious to the $^{212}Pb$ precursor isotope source is in contact with the $^{212}Pb$ precursor isotope source.

In one or more embodiments of the invention the container does not comprise a gas permeable barrier impervious to the $^{212}Pb$ precursor isotope source.

In one or more embodiments of the invention the volume of the container is 1 μl to 10 liters, such as 1 μl to 1 liter, such as 100 μl to 10 ml, such as 100 μl to 100 ml.

In one or more embodiments of the invention the substantially free of the $^{212}Pb$ precursor isotope source on the inner wall of the container is less defined as less than 3% $^{224}Ra$ of the $^{212}Pb$ precursor isotope source, such as less than 1%, such as less than 0.5%, as measured as % radioactivity relative to $^{212}Pb$.

In one or more embodiments of the invention the inner walls of the container are coated. The coating may be a film of salt or other suitable material on the inner walls.

In one or more embodiments of the invention the inner walls of the container are coated with a compound that comprises a chelator which can complex with $^{212}Pb$.

In one or more embodiments of the invention the inner walls of the container are coated with a chelator which is TCMC or a variant hereof.

In one or more embodiments of the invention the container comprises an aqueous or an oil solution.

DETAILED DESCRIPTION

The present inventors have in response to the need for a simpler, safer system with less size and transport distances to handle the short half-life of $^{220}Rn$ and $^{212}Pb$, designed an assembly whereby the radon producing source is placed inside the collector chamber or container. Instead of using $^{228}Th$ only as a source the present invention is flexible and can use pure $^{224}Ra$ or a combination of $^{228}Th$ or $^{224}Ra$ as source, or even their precursor isotopes (FIG. 1).

The assembly of the present inventions can be made very compact and very simple, allowing for a shippable and disposable $^{212}Pb$-generator unit. In the present context is assembly, diffusion generator and system are used interchangeably. The described assembly or system may therefore be termed a single chamber diffusion generator for $^{212}Pb$.

Thus, an object of the present invention relates to a method for obtaining a container comprising $^{212}Pb$ on the inner walls comprising the steps of providing an assembly comprising a first part and a second part, wherein the first part comprises a container and the second part comprises a $^{212}Pb$ precursor isotope source, connecting the first part and the second part such that the $^{212}Pb$ precursor isotope source does not come into contact with an inner wall of the container and such that a single chamber container assembly is provided, allowing the $^{212}Pb$ precursor isotope source sufficient time to decay to progenies $^{220}Rn$, $^{216}Po$, and/or $^{212}Pb$, and sufficient time for $^{220}Rn$, $^{216}Po$ and/or $^{212}Pb$ to settle onto the inner walls of the single chamber container assembly, removing or isolating the remaining $^{212}Pb$ precursor isotope from the single chamber assembly without having the $^{212}Pb$ precursor isotope source come into contact with an inner wall of the single chamber container assembly, and obtaining a container comprising $^{212}Pb$ on an inner wall of the container and substantially free of the $^{212}Pb$ precursor isotope source on the inner wall of the container. Examples of such containers or assemblies are described in the examples of the present disclosure and can also be seen in FIGS. 2-5B.

An aspect of the invention relates to a method of obtaining a $^{212}Pb$ solution comprising obtaining the above container comprising $^{212}Pb$ on the walls and collect the $^{212}Pb$ in a solution. The $^{212}Pb$ can be collected in a solution that is in the container before the $^{212}Pb$ is generated or using a solution that is introduced to the container after the $^{212}Pb$ has been generated, and then collected. The collection can be done for example using a syringe.

A further object of the present invention relates to an assembly comprising a first part and a second part, wherein the first part comprises a container and the second part comprises a $^{212}Pb$ precursor isotope source, wherein the first part and the second part are connected such that the $^{212}Pb$ precursor isotope source does not come into contact with an inner wall of the container, and such that a single chamber container assembly is provided.

Yet another object of the present invention relates to a single chamber container assembly comprising a first part and a second part, wherein the first part comprises a container and the second part comprises a $^{212}Pb$ precursor isotope source, wherein the first part and the second part are connected such that the $^{212}Pb$ precursor isotope source does not come into contact with an inner wall of the container.

A huge advantage with the described assembly (or also defined herein as a container, system or a generator) is the ability to supply $^{212}Pb$ without the activity level is dictated by the short (10.6 h) half-life of $^{212}Pb$. With the described system it is possible to produce a diffusion generator in a centralized production facility and ship it to the end user. A portable disposable generator could be made and shipped to e.g. a hospital from one end or the world to the other. For such a disposable unit, a pure $^{224}Ra$ (without $^{228}Th$) is preferable as this would become inactive after 40-50 days approximately avoiding generation of long-lived radioactive waste. Such a diffusion source will steadily produce $^{220}Rn$/$^{212}Pb$ in a fashion dictated by the half-life of $^{224}Ra$ (Table 1 and FIG. 1). The container, comprising the $^{212}Pb$ precursor isotope source, will produce $^{212}Pb$ due to the nature of decaying isotopes. The amount of $^{212}Pb$ deposited on will depend on several factors including the choice of $^{212}Pb$ precursor isotope source and time. The time is an important factor. An object of the invention relates to a method for preparing a substantially pure $^{212}Pb$ solution, the method comprising obtaining the assemblies and containers described herein, wherein the $^{212}Pb$ precursor isotope source is kept in the sealed assemblies and containers for a given time, the $^{212}Pb$ precursor isotope source is isolated or removed without coming into contact, and the $^{212}Pb$ on the walls are then collected by adding a solution that is suitable for collecting the $^{212}Pb$. The time that the $^{212}Pb$ precursor isotope source is kept in the assemblies and containers of the present invention can be from minutes, to hours, to days, to years, depending on the choice of $^{212}Pb$ precursor isotope source and the amount of $^{212}Pb$ needed. The time can be at least one day. The time can be at least one day. The time can be at least two days. The time can be at least four days. The time can be at least a week. The time can be at least two weeks. The time can be at least two weeks. The time can be at least a month. The time can be at least a year. $^{212}Pb$ is a member of the thorium natural radionuclide series and can be found in materials containing $^{232}Th$ ($t_{1/2}$=1.4×$10^{10}$ years). The $^{212}Pb$ precursor can therefore be chosen based on the intended use. A precursor with longer half-life can be chosen to generate an assembly or system that that will act as a $^{212}Pb$ generator for continuous production over a longer period of time. Alternatively, an isotope with a shorter half-life be used is the intended use for example is at a hospital or similar where generation of long-lived radioactive waste can be problematic. Naturally a mix of different precursors will therefore also be relevant and also where specific assemblies are needed for the generation of a specific amount of $^{212}Pb$ over a specific period of time.

Thus, in one or more embodiments of the invention the $^{212}Pb$ precursor isotope source is selected from the group consisting of $^{232}Th$, $^{228}Ra$, $^{228}Ac$, $^{228}Th$ and/or $^{224}Ra$. Thus, in the following $^{212}Pb$ precursor isotope is defined as a mother nuclide, grandmother nuclide, great grandmother nuclide etc. for $^{212}Pb$, i.e. $^{216}Po$, $^{220}Rn$, $^{224}Ra$ $^{228}Th$, $^{228}Ac$, $^{228}Ra$, $^{232}Th$.

The decay of these radioisotopes can be seen in FIG. 1 which clearly indicate the possibility of creating a $^{212}Pb$ precursor isotope source with different decay profiles and different combinations of precursor isotopes will be able to generate $^{212}Pb$ at different rates over different periods of time.

In one or more embodiments of the invention the $^{212}Pb$ precursor isotope source is a mixture of $^{232}Th$, $^{228}Ra$, $^{228}Ac$, $^{228}Th$ and $^{224}Ra$. In one or more embodiments of the invention the $^{212}Pb$ precursor isotope source is a mixture of $^{228}Th$ and $^{224}Ra$. The source can also be each of $^{232}Th$, $^{228}Ra$, $^{228}Ac$, $^{228}Th$ and $^{224}Ra$ individually, but due to the decay will a mixture naturally over time occur because $^{232}Th$ will decay to $^{228}Ra$ and so on. The key is that the gaseous $^{220}Rn$ is produced because it will diffuse from the source and later settle on the inner walls of the container as $^{212}Pb$.

In one or more embodiments of the invention the $^{212}Pb$ precursor isotope source is $^{228}Th$ that has at least 90%, such as at least 80%, such as at least 70%, such as at least 60%, such as at least 50%, such as at least 40%, such as at least 30%, such as at least 20%, such as at least 10% $^{228}Th$ measured as % radioactivity relative to $^{212}Pb$.

In one or more embodiments of the invention the $^{212}Pb$ precursor isotope source is $^{224}Ra$. In one or more embodiments of the invention the $^{212}Pb$ precursor isotope source is $^{228}Th$. The $^{212}Pb$ activity may vary from typically 0% to 114% of the $^{224}Ra$ precursor activity in the generator depending on the ingrowth status. The $^{212}Pb$ activity can be at least 90%, such as at least 80%, such as at least 70%, such as at least 60%, such as at least 50%, such as at least 40%, such as at least 30%, such as at least 20%, such as at least 10% of the $^{224}Ra$ precursor activity. The $^{212}Pb$ activity can be at least at least 10% of the $^{224}Ra$ precursor activity. The $^{212}Pb$ activity can be at least at least 10% of the $^{224}Ra$ precursor activity. The $^{212}Pb$ activity can be at least at least 20% of the $^{224}Ra$ precursor activity. The $^{212}Pb$ activity can be at least at least 30% of the $^{224}Ra$ precursor activity. The $^{212}Pb$ activity can be at least at least 40% of the $^{224}Ra$ precursor activity. The $^{212}Pb$ activity can be at least at least 50% of the $^{224}Ra$ precursor activity. The $^{212}Pb$ activity can be at least at least 60% of the $^{224}Ra$ precursor activity. The $^{212}Pb$ activity can be at least at least 70% of the $^{224}Ra$ precursor activity. The $^{212}Pb$ activity can be at least at least 80% of the $^{224}Ra$ precursor activity. The $^{212}Pb$ activity can be at least at least 90% of the $^{224}Ra$ precursor activity. The $^{212}Pb$ activity can be at least at least 100% of the $^{224}Ra$ precursor activity. The $^{212}Pb$ activity can be at least at least 110% of the $^{224}Ra$ precursor activity. The $^{212}Pb$ activity can be up to 20% of the $^{224}Ra$ precursor activity. The $^{212}Pb$ activity can be up to 30% of the $^{224}Ra$ precursor activity. The $^{212}Pb$ activity can be up to 40% of the $^{224}Ra$ precursor activity. The $^{212}Pb$ activity can be up to 50% of the $^{224}Ra$ precursor activity. The $^{212}Pb$ activity can be up to 60% of the $^{224}Ra$ precursor activity. The $^{212}Pb$ activity can be up to 70% of the $^{224}Ra$ precursor activity. The $^{212}Pb$ activity can be up to 80% of the $^{224}Ra$ precursor activity. The $^{212}Pb$ activity can be up to 90% of the $^{224}Ra$ precursor activity. The $^{212}Pb$ activity can be up to 100% of the $^{224}Ra$ precursor activity.

In one or more embodiments of the invention the $^{212}Pb$ precursor isotope source is $^{224}Ra$. In one or more embodiments of the invention the $^{212}Pb$ precursor isotope source is $^{224}Ra$ that has at least 90%, such as at least 80%, such as at least 70%, such as at least 60%, such as at least 50%, such as at least 40%, such as at least 30%, such as at least 20%, such as at least 10% $^{224}Ra$ measured as % radioactivity relative to $^{212}Pb$.

The assembly working as a $^{212}Pb$ generator unit can be mass produced in a centralized production facility and shipped to end users for application in production of radiopharmaceuticals. It can also be adapted and used for large scale centralized production of $^{212}Pb$. Thus, the amount of radioactivity in the assembly can adjusted according to its intended use. In one or more embodiments of the invention will the total amount of radioactivity in the single chamber container assembly therefore can be 1 kBq-100 GBq, such as 1 kBq-10 MBq, such as 100 kBq-10 MBq, such as 1 MBq-1 GBq, such as 10 MBq-10 GBq, such as 1 MBq-1 GBq, such as 1 GBq-100 GBq. The total amount of radioactivity in the single chamber container assembly can be 1 kBq-100 GBq. The total amount of radioactivity in the single chamber container assembly can be 1 kBq-10 MBq. The total amount of radioactivity in the single chamber container assembly can be 100 kBq-10 MBq. The total amount of radioactivity in the single chamber container assembly can be 1 MBq-1 GBq. The total amount of radioactivity in the single chamber container assembly can be 10 MBq-10 GBq. The total amount of radioactivity in the single chamber container assembly can be 1 MBq-1 GBq. The total amount of radioactivity in the single chamber container assembly can be 1 GBq-100 GBq.

In one or more embodiments of the invention will the amount of $^{212}Pb$ radioactivity in the single chamber container assembly therefore can be 1 kBq-100 GBq, such as 1 kBq-10 MBq, such as 100 kBq-10 MBq, such as 1 MBq-1 GBq, such as 10 MBq-10 GBq, such as 1 MBq-1 GBq, such as 1 GBq-100 GBq. In one or more embodiments of the invention will the amount of $^{212}Pb$ precursor isotope source radioactivity in the single chamber container assembly therefore can be 1 kBq-100 GBq, such as 1 kBq-10 MBq, such as 100 kBq-10 MBq, such as 1 MBq-1 GBq, such as 10 MBq-10 GBq, such as 1 MBq-1 GBq, such as 1 GBq-100 GBq.

The $^{212}Pb$ precursor isotope source can be in different forms, sizes and shapes depending on the application type. Thus, in one or more embodiments of the invention the $^{212}Pb$ precursor isotope source is in the form of an inorganic or organic salt, such as $RaCl_2$. The $^{212}Pb$ precursor isotope source can also be in a dry form or in a liquid solution, such as an aqueous solution or a dispersion. In one or more embodiments of the invention the $^{212}Pb$ precursor isotope source is in a liquid solution that is at acidic, neutral or basic pH. The pH can be 1-14, such as pH 1-6, pH 2-6, pH 2-8, pH 4-8, pH 5-7, pH 6-8, pH 7-8, pH 7.2, pH 8-10, pH 8-12, or pH 10-14.

The solution can be an aqueous solution. The solution can be a 0.1 M aqueous HCl solution. This solution can also be used to dissolve the $^{212}Pb$ on the walls of the assembly.

The assembly working as a generator system may be used for preparing single patient dosing or for multiple patient dosing, or even for industrial use. The amount of radioisotope can therefore be adjusted depending on the application of the assembly.

The $^{212}Pb$ precursor isotope source can be placed on the rod, either directly or on a strip attached to the rod, typically in a very small liquid volume. In one or more embodiments of the invention the $^{212}Pb$ precursor isotope source is deposited on a strip or sphere that is made of a material suitable for application of a liquid. Such liquid can be in the amount of 1 μl to 1 ml, such as 1 μl to 10 μl, such as 1 μl to 100 μl.

When the container, which can be a vial, can be empty or contain a small volume of liquid in the bottom, that is not touching the source. In one or more embodiments of the invention the container comprises an aqueous or an oil solution.

It is important that the source does not drip or chip of in a fashion that causes cross contamination of the inner surfaces of the collector unit (container) with source material and that the source and source holder can be removed and or withdrawn from the collector without causing cross contamination by contact.

In one or embodiments the source is surrounded by a grid or encapsulated in a porous material to reduce risk of cross-contamination. This encapsulation can be a gas permeable barrier impervious to the $^{212}Pb$ precursor isotope source.

Thus, in one or more embodiments of the invention the container does or does not comprise a gas permeable barrier impervious to the $^{212}Pb$ precursor isotope source.

In one or more embodiments of the invention the $^{212}Pb$ precursor isotope source is placed on or in a sphere, suitable for holding the source but allowing radon diffusion. The container may comprise a gas permeable barrier impervious to the $^{212}Pb$ precursor isotope source, and the gas permeable barrier impervious to the $^{212}Pb$ precursor isotope source can be in contact with the $^{212}Pb$ precursor isotope source. In one or more embodiments of the invention the single chamber container assembly is gas tight.

FIG. 2 shows an example of the single chamber container assembly where the container (the first part) is connected with a cap and a rod attached to the cap is used to hold the $^{212}Pb$ precursor isotope source (the second part) without having this source touch an inner wall of the container during the entire process.

In one or more embodiments of the invention the $^{212}Pb$ precursor isotope source can therefore be bound to a non-radioactive material, such as particles or a holding material. These can ensure that the source does not contaminate the container. The $^{212}Pb$ precursor isotope source can be deposited on a strip, sphere or a rod which is made of material that is selected from the group consisting of paper, plastic, metal, ceramic, and natural or synthetic fibers. The strip or sphere can be attached to the second part or be contained or comprised in the second parts, which comprises means for holding the strip or sphere. Such means can for example be a rod.

In one or more embodiments of the invention the second part comprises, optionally, a rod that is attached to the means for opening and closing the container. The means for opening and closing the container can be a cap, cover or a lid which can be made of a material selected from the group consisting of rubber, glass, paper, plastic, metal, ceramic, and natural or synthetic fibers, cellulose ion exchange resin, natural mineral, polymer. Alternatively, the source is attached to a material placed onto the cap with or without being adhered to the cap. If the cap is placed on the bottom, the source material can be simply placed onto the interior of the cap without touching the $^{212}$Pb collector part and kept in place by gravitation. In such case the generator unit should be stored and handled in position whereby cap with the source is always kept at the bottom.

The means for opening and closing the container can comprise the $^{212}$Pb precursor isotope source. The $^{212}$Pb precursor isotope source can be placed on a sponge, a wool or another substance that is capable of keeping the $^{212}$Pb precursor isotope source in the means for opening and closing the container. The wool can be a quartz wool. The wool can also be a mineral wool. The wool can also be a glass wool. The substance that is capable of keeping the $^{212}$Pb precursor isotope source in the means for opening and closing the container can be attached by glue, double-sided mounting tape or other means for attachment.

In one or more embodiments of the invention the second part comprises a syringe, or wherein the rod is the syringe. The means for holding can be deposited on a strip or sphere which is made of material that is selected from the group consisting of paper, plastic, metal, ceramic, and natural or synthetic fibers cellulose ion exchange resin, natural mineral, polymer.

In one or more embodiments of the invention the syringe tip has been pushed through a rubber cap. An alternative design is where the second part is a rubber cap, or septum of another material permeable, and preferential self-sealing, with a syringe tip, with means for holding the $^{212}$Pb precursor isotope source attached to the cap or to the inner walls of the container. In this case will user of the assembly be able to dissolve the $^{212}$Pb from the inner walls of the container in an aqueous solution though a syringe that is pushed through the cap. The resulting $^{212}$Pb in aqueous solution can afterwards be collected by the same syringe which will generate the option of working in a GMP environment which can be directly applied for patient use. Thus, in one embodiment the $^{212}$Pb precursor isotope source be withdrawn into a capsule or similar allowing the container to be washed e.g., by using a solution transferred via a syringe through a rubber septum, without having to disassemble the two units. In another embodiment the assembly can be autoclaved, and the solution be of a physiological acceptable composition containing a chelator for disease targeting allowing withdrawal into a syringe and direct infusion with or without the use of a sterile syringe filter. In one embodiment the assembly including all subunits is autoclavable and with a syringe permeable zone on the cap allowing aseptic extraction of $^{212}$Pb from the assembly.

After a few hours or days of operation the assembly with the $^{212}$Pb precursor isotope source can be used for producing $^{212}$Pb by retracting the $^{212}$Pb precursor isotope source, e.g., by changing the cap with the attached $^{212}$Pb precursor isotope source to a new cap without radioactivity and washing the inner surface with a suitable solution to dissolve surface deposited $^{212}$Pb and progenies. Since the $^{212}$Pb solution is free from long lived predecessor radionuclides it can be used directly without further chemical processing to label carrier molecules for e.g. cancer therapy.

The $^{212}$Pb precursor isotope source can be associated with a needle, rod or a strip of a material of which $^{212}$Pb precursor isotope source is attached to allow diffusion of $^{220}$Rn. The source may or may not contain a holder for the radioactive part and a grid or ring or similar surrounding the source to prevent cross contamination when the $^{212}$Pb precursor isotope source is withdrawn from the container. In one embodiment it may be attached to a screw cap that can be used to close the container. The $^{212}$Pb precursor isotope source can be isolated from the container by withdrawing the source into a cover. This will ensure that the source does not cross contaminate the inner walls of the container while the $^{212}$Pb is extracted, and also limit risk of exposure to the user of the assembly. It is important that after a period of decay the $^{212}$Pb precursor isotope source and the $^{212}$Pb adsorbed onto the vial inner surfaces can be separated by withdrawing the $^{212}$Pb precursor isotope source form the container, e.g. by replacing the screw cap of which the source is attached by a rod or similar with a standard gas tight screw cap. Thus, in one special embodiment is the $^{212}$Pb precursor isotope source equipped with a retractable radioactive source that is withdrawn into the cap similar to a "click pen system" or similar for isolating the source from the generator unit's interior surfaces and thus not require the disassembling and replacement of the cap (e.g. FIGS. 2 and 4A-4B). Thus, the second part of the assembly can comprise a piston that can be in open and closed positions. The second part of the assembly can also comprise a chamber with a gas tight o-ring seal. In one or more further embodiments the assembly comprises a gas and liquid tight lid or valve in the second part.

The second part of the assembly can, optionally, comprise a needle, rod or strip which may be supplied with a small ball of a material that can absorb radium or thorium including glass wool, quartz wool, mineral wool, metal, paper, cotton, stearate or another fatty acid, metal, cellulose, natural mineral, polymer, ion exchange resin, or other fibrous material. The composition of the holder of the precursor isotope should be chosen with care according to the known affinity of radon for various materials. A material that $^{228}$Th and or $^{224}$Ra has a good adsorption or absorption to and $^{220}$Rn has a low affinity for would be suitable. The container can be made of a glass (including quartz), polymer and or metal, such as a glass vial, with a screw cap or similar, whereby the source is attached to the screw cap. The container (or assembly) can be a glass flask placed up-side down and with for example quartz wool with $^{224}$Ra or $^{228}$Th placed in the center of the inside of the cap. $^{212}$Pb can be produced by unscrewing the flask standing up-side down from the cap with the source, and thereafter washing the interior of the flask with a solution to dissolve $^{212}$Pb. The container can have a volume of 1 μl to 10 liters, such as 1 μl to 1 liter, such as 100 μl to 10 ml, such as 100 μl to 100 ml. The volume will depend on the use, where single use generally will be smaller and industrial batch containers will be larger.

Minimizing risk of cross contamination is important and the assembly has to be designed so that the $^{212}$Pb precursor isotope source does not come into contact with the inner walls of the container. Thus, in one or more embodiments of the invention the container is substantially free of the $^{212}$Pb precursor isotope source on the inner wall of the container. The definition of substantially free depends on use of the $^{212}$Pb produced in the assembly. In one or more embodiments of the invention is "substantially free" defined as less than 3% $^{224}$Ra of the $^{212}$Pb precursor isotope source, such as less than 1%, such as less than 0.5%, as measured as % radioactivity relative to $^{212}Pb$. In one or more embodiments of the invention, the substantially free refers to the purity of $^{212}Pb$ vs $^{224}Ra$ in a solution from the walls of the container. This purity can be better than 95%. This purity can be better than 98%. This purity can be better than 99%. This purity can be better than 99.5%. This purity can be better than 99.8%.

The container is surrounding, but not touching, the $^{212}Pb$ precursor isotope source. This should be made of an appropriate material, for example glass, plexiglass, metal, ceramics, polymer including polypropylene and Teflon or other materials suitable for allowing deposition of $^{220}Rn$ and/or $^{212}Pb$ on its inner walls and allowing $^{212}Pb$ to be dissolved when washed with a suitable solution for further use in radiolabeling. A solution can be used to wash the inner walls of the container to extract radionuclides, mainly $^{212}Pb$ and progenies. It may be present during the $^{212}Pb$ production period in the assembly or be applied after the $^{212}Pb$ precursor isotope source has been removed or withdrawn. In one embodiment the solution and an acidic or alkaline solution that can be transferred and neutralized before use for administration to a patient. In one embodiment the solution may be water of a suitable purity for pharmaceutical use. Solution volume of 1 ul to 1 liter for single dosing, e.g. 100 ul to 10 ml, and 1 ul to 10 liter or higher for multiple dosing may be used.

The container may or may not contain a surface film on the inner surfaces or some liquid to assist in collecting the diffusion product. This surface film can for example be a coating. Size and volume may be in microliter to ml for single dosing units and in microliters to tens of liters or higher for multiple dosing. The inner walls of the container can be coated. This coating can ensure that $^{212}Pb$ settles in an optimal way. In one or more embodiments of the invention the inner walls of the container are coated with a compound that comprises a chelator which can complex with $^{212}Pb$. It is also possible that the inner walls are coated with one or more compounds where a complex with $^{212}Pb$ is needed. In one or more embodiments of the invention the inner walls of the container are coated with a chelator capable of chelating $^{212}Pb$. This chelator can be TCMC or a variant hereof. The coating may be a film of salt or other suitable material on the inner walls.

In a special embodiment the container is washed directly with the reaction solution containing the complexing agent to yield a radiolabeling solution which after a suitable reaction time can be used directly for therapeutic purposes.

In one embodiment the final product solution is autoclaved and or sterile filtered before administration to a subject in need thereof.

In one embodiment the assembly can be attached to a flushing and filtering circuit whereby when the source is retraced from the chamber a reservoir of a solution is connected and an outlet with a sterile filter and a syringe or vacuum pump is attached to flush the chamber and collect the flushing solution, e.g., in similar fashion as for $^{99m}Tc$-generators.

In general, surface ratios between precursor source holder and the collector chamber inner surfaces should be optimized so that as much as possible of the generated $^{212}Pb$ settles on the collector chamber surfaces. The surfaces may be smooth, or porous or may contain structures to increase surface area relative to the diffusion subunit, container or assembly.

The production can be a production period of 5 hours, 10, hours, 20 hours or more. Afterwards the source may be withdrawn from the chamber into a tube-shaped holder or similar with a gas and liquid tight lid in the bottom that closes when the source is completely withdrawn. This allows for addition of a washing solution, e.g., by a syringe, or activation of a flushing and collecting circuit e.g. similar to that of a $^{99m}Tc$ generator.

In a special embodiment the single chamber diffusion unit has its $^{212}Pb$ precursor isotope source as a film on the inside surfaces of the assembly and has the $^{212}Pb$ collector unit (container) inserted into the source covered surfaces without touching these, i.e. a reverse configuration compared to what is shown in FIG. 2.

In another embodiment the diffusion generator is subject to temperature manipulation, either elevated or reduced temperature vs 20° C.

The use of the invention for includes in the production of radiopharmaceuticals, medical devices and or standardization sources for $^{212}Pb$. The assembly of the present invention can be used to generate a $^{212}Pb$ standard for calibrations.

In one or more embodiments of the invention is the assembly of the present invention comprised in kit with the $^{212}Pb$ precursor isotope source, and a solution containing a chelator, and a compound that for use in therapy. Such compound can be a nano- or microparticle. In one embodiment such a kit will contain a $^{212}Pb$ precursor isotope source, a solution for washing the inner walls of the container and a solution or dry form of a carrier compound, for example a chelator, micro- or nanoparticles.

TABLE 1

Main radiation properties of the $^{224}Ra$ series.

| Radionuclide (half-life) | Alphas and betas (mean energy in MeV) | X-rays and gammas Energy and % abundance |
|---|---|---|
| $^{224}Ra$ (3.6 days) | α 5.6 | 241 keV, 4.1% |
| $^{220}Rn$ (55.6 s) | α 6.3 | |
| $^{216}Po$ (145 ms) | α 6.8 | |
| $^{212}Pb$ (10.6 h) | β 0.1 | 75 keV, 10.3%<br>77 keV, 17.1%<br>87 keV, 6.0%<br>90 keV, 1.5%<br>239 keV, 43.6%<br>300 keV, 3.3% |
| $^{212}Bi$ (1 h) | α 6.1 × 0.36 (2.2 MeV effective[1])<br>β 0.7 × 0.64 (0.4 MeV effective) | 727 keV, 6.7% (4.3% effective) |
| $^{212}Po$ (299 ns) (64% branch) | α 8.8 (5.6 effective) | |
| $^{208}Tl$ (3.1 min) | β 0.6 (0.2 MeV effective) | 75 keV, 3.4% (1.2% effective) |

TABLE 1-continued

| Main radiation properties of the $^{224}$Ra series. | | |
|---|---|---|
| Radionuclide (half-life) | Alphas and betas (mean energy in MeV) | X-rays and gammas Energy and % abundance |
| (36% branch) | | 511 keV, 22.6% (8.1% effective)<br>583 keV, 85.0% (30.6% effective)<br>860 keV, 12.5% (4.5% effective)<br>2615 keV, 99.8% (35.9% effective) |

[1]Average per $^{224}$Ra transformation due to branching. Only X-rays or gammas above 1% effective abundance accounted for. Adds up to a total effective energy of approximately 26.5 MeV of alpha of 0.7 MeV of beta per complete decay of a $^{224}$Ra atom via progenies to a stable $^{208}$Pb atom.

TABLE 2

A pure $^{212}$Pb source with initial 100 MBq $^{212}$Pb kept sealed and emptied for $^{212}$Pb only once.

| | Time | | | |
|---|---|---|---|---|
| | 24 h | 48 h | 72 h | 96 h |
| $^{212}$Pb (MBq) total | 23.1 | 4.4 | 0.92 | 0.192 |

TABLE 3

Lead-212 production from a source with initial 100 MBq $^{224}$Ra kept sealed and emptied for $^{212}$Pb only once.

| | Time | | | |
|---|---|---|---|---|
| | 24 h | 48 h | 72 h | 96 h |
| $^{212}$Pb (MBq) total | 70.3 | 72.9 | 63.4 | 53.1 |
| 70% extraction recovery (MBq $^{212}$Pb) in final product | 49.2 | 51.0 | 44.4 | 37.2 |

TABLE 4

Lead-212 production from a source with initial 100 MBq $^{224}$Ra source emptied for $^{212}$Pb every 24 h.

| | Time | | | |
|---|---|---|---|---|
| | 24 h | 48 h | 72 h | 96 h |
| $^{212}$Pb (MBq) total | 70.3 | 58.2 | 48.1 | 39.8 |
| 70% extraction recovery (MBq $^{212}$Pb) in final product | 49.2 | 40.7 | 33.7 | 27.9 |

The following figures and examples are provided below to illustrate the present invention. They are intended to be illustrative and are not to be construed as limiting in any way.

BRIEF DESCRIPTION OF THE FIGURES

FIG. 5A shows a 100, 50 and 10 ml generator unit for $^{212}$Pb production. FIG. 5B shows the cap with quartz wool in the center of the inner surface. The $^{212}$Pb precursor nuclide solution can be placed onto the quartz wool and the flask mounted for up-side-down storage to produce $^{212}$Pb deposited on the flask' inner surface generated via $^{220}$Rn diffusion from the precursor source material.

EXAMPLES

Figure 1:
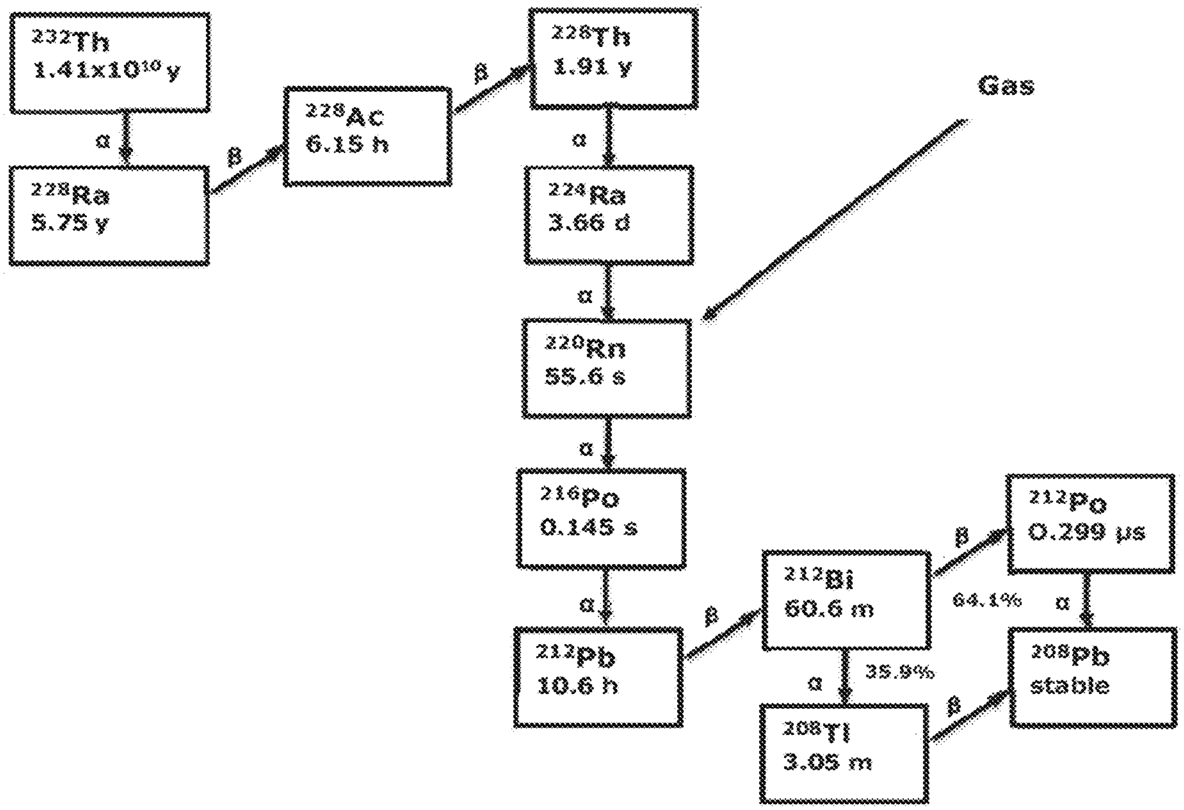
FIG. 1 shows the decay of $^{232}$Th to its progenies. The decay type (alpha or beta) is indicated and so is the half-lives. These half-lives are important because they dictate the decay rate and are therefore also key in deciding the optimal mix of isotopes as $^{212}$Pb precursor isotope source for the production of $^{212}$Pb.

Example 1—Calculation of the Relative $^{212}$Pb Daughter Nuclide Level at Various Time Points Background. The development and use of pure $^{212}$Pb in therapeutic radiopharmaceuticals is hampered by the short half-life (10.6 h) of the radionuclide making it almost impossible to produce a product in a centralized fashion and shipped to the end user. If $^{224}$Ra is used as a short-term generator for $^{212}$Pb the level of $^{212}$Pb activity can be maintained essentially according to the half-life of $^{224}$Ra, which is 3.6 days. The variation in $^{212}$Pb level in a sealed source of pure $^{224}$Ra is shown.

Method: The ingrowth of $^{212}$Pb from a pure $^{224}$Ra source were calculated using a universal activity calculator.

Results: Table 2 shows the amount of $^{212}$Pb at various time points after the production of a pure ($^{224}$Ra-free) pharmaceutical solution and storage in a gas tight container. As can be seen the pure $^{212}$Pb source rapidly decays and lose more than 75% per 24 h. Table 3 shows the amount of $^{212}$Pb present in a sealed source of $^{224}$Ra at the same time points. As can be seen the $^{212}$Pb activity is maintained at a high level (>50%) at least up to 96 h.

Table 4 shows the effect of "milking" a $^{224}$Ra precursor-based generator for $^{212}$Pb several times during a 96-h period.

The data also shows that significant amount of daughter nuclide is present within a relatively short time frame when starting with pure $^{224}$Ra. It is noteworthy though that the ratio of $^{212}$Pb to $^{224}$Ra in the solution reaches 1 after 36 hours and thereafter gradually increases to about 1.1 of which is kept for the rest of the time until complete decay. In conclusion, using $^{224}$Ra as a source for $^{212}$Pb makes the logistic of centralized production and shipment to end users possible providing an easy way to extract the $^{212}$Pb from $^{224}$Ra exist.

Example 2—Preparation of Radionuclides and Counting of Radioactive Samples

In the following, all work with the concentrated radioactive preparations including evaporation of solvent etc was performed in a glove-box. A source of $^{228}$Th in 1 M HNO3 was acquired from a commercial supplier. Ac-resin was obtained from Eichrom Technologies LLC (Lisle, IL, USA) in the form of a pre-packed cartridge.

Radium-224 was made from $^{228}$Th bound to Actinide resin (Eichrom Technologies, LLC) by eluting a column containing actinide resin with immobilized $^{228}$Th with 1 M HCl. The eluate was purified on a second Ac-resin column and the eluate evaporated to dryness using an evaporation vial with a cap with gas inlet and outlet placed in a heater block at approximately 110° C. and a gentle stream of nitrogen gas to evaporate of the solvent. When the evaporation vial was empty from solvent it was added 0.1 M HCl to dissolve the residue, typically 200-400 µl. Typically, more than 70% of the $^{224}$Ra present in the $^{228}$Th source could be extracted and purified using the described methods.

Radioactive samples were counted on a Cobra II Autogamma counter (Packard Instruments, Downer Grove, IL, USA). During extraction of $^{224}$Ra from the $^{228}$Th source, a CRC-25R dose calibrator (Capintec Inc., Ramsey, NJ, USA) was used.

Example 3—Determining Net Count Rate for $^{212}$Pb in a $^{212}$Pb/$^{224}$Ra Mixture Before Radioactive Equilibrium has been Reached After more than 3 days, i.e., "equilibrium" a sample kept gas tight will for practical purposes have 1.1 times $^{212}$Pb vs $^{224}$Ra.

In a gas tight unit regardless of whether $^{212}$Pb is at or lower than equilibrium it can be assumed that this is reached after 3 days since surplus $^{212}$Pb is reduced by 99% and the ingrowth of $^{212}$Pb from $^{224}$Ra is practically complete vs. "equilibrium".

Using the Cobra II Autogamma counter with a counting window setting from 70-80 KeV gives mainly the $^{212}$Pb with very little contribution from other radionuclides in the $^{224}$Ra series. Radium-224 must be indirectly counted when the initial $^{212}$Pb has vanished and equilibrium between $^{224}$Ra and $^{212}$Pb has been reached (after approximately 3 days). This indirect counting requires the sample to be stored in a relatively gas tight containers as otherwise the $^{220}$Rn may escape preventing the radionuclide equilibrium of 1.1 between $^{212}$Pb and $^{224}$Ra to be reached.

Since sampling and counting may be separated by some time, the net count rate for $^{212}$Pb can be adjusted for decay to determine the net $^{212}$Pb count rate at the time of sampling. By storing $^{212}$Pb samples for a week or longer and remeasure, the amount of $^{224}$Ra contaminant can be determined as activity after about 110 hours of storage would not be $^{212}$Pb but must be from longer lived precursor isotope.

Figure 3A:
FIGS. 3A-3B show pictures of a crude version of the generator system based on a 3 ml v-vial with a membrane inserted open top screw cap penetrated by a syringe tip (with position fixed by tape on top of screw cap) and with a strip of laboratory bench paper attached to the syringe tip (left picture shows the $^{212}$Pb precursor isotope source and container). The $^{212}$Pb precursor isotope source is placed onto the strip by a pipette before the screwcap with the source is carefully attached to the vial (right picture). It is very important that the source is not touching the vial when assembling and disassembling the unit to avoid cross-contamination.
Figure 3B:
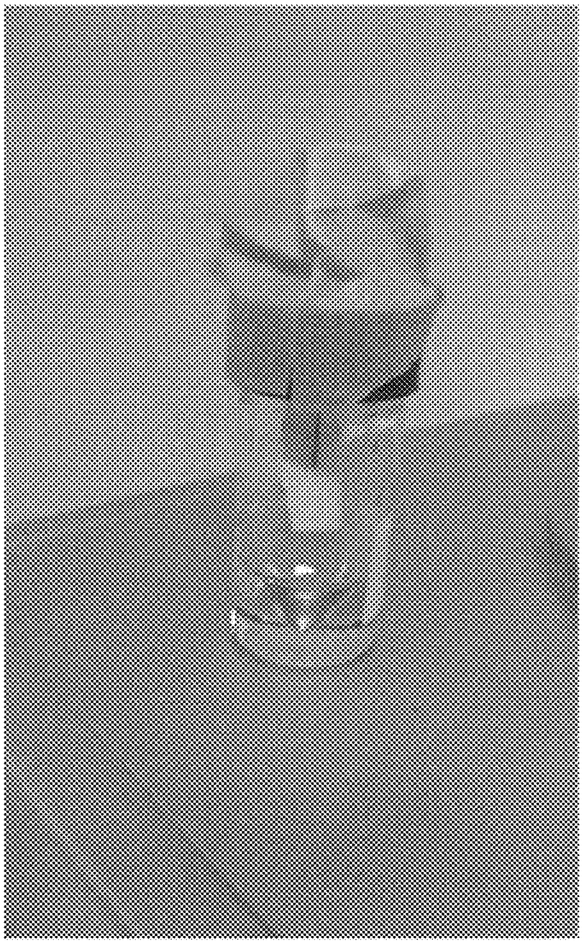

Example 4—a Simplified Single Chamber (Diffusion Chamber Generator) Assembly for $^{212}$Pb Production (FIGS. 3A-3B)

A 3 ml v-vial with an open top cap. The open top cap was supplied with a membrane permeable by a syringe tip. A syringe tip was pushed through the membrane and fixed with tape on top to lock the position of the tip with regard to the open top cap. On the syringe tip vas placed a strip of absorbent paper about 0.5×3 cm by inserting the syringe tip in two holes in the strip. The paper strip was added 2-40 ul $^{224}$Ra solution. Thereafter the cap was placed carefully onto the v-vial while the syringe tip and radioactive strip were not to touch the inside of the v-vial. Thereafter the assembly was standing for various time to produce $^{212}$Pb via $^{220}$Rn diffusion from the strip to the space surrounding the strip. The $^{212}$Pb tended to settle on the inner surfaces of the v-vial. Depending on the liquid volumes used for applying the $^{224}$Ra source onto the strip, there may be some condensation of liquid due to evaporation/condensation of the liquid applied. Alternatively, the source could be dried before assembling the unit to avoid any solvent condensation on the v-vial inner surfaces.

Example 5A: Production of $^{212}$Pb with the $^{212}$Pb Precursor Isotope Source Absorbed on a Paper Strip Methods: The assembly was assembled with $^{224}$Ra placed on the strip of the diffusion subunit inserted in a v-vial according to FIGS. 3A-3B, and was standing for 17.5 h or more to produce $^{220}$Rn and $^{212}$Pb. Production of $^{212}$Pb evaluation of radiochemical purity of product. At the end of the production period the whole unit was measured on a Capintec dose calibrator. The product was evaluated by separating the source from the container and cap the latter with a gas tight screw cap and measure immediately in the Capintec dose calibrator. The purity of the product was determined by measuring the collector subunit again after a few days when all the $^{212}$Pb had decayed but the presence of longer-lived predecessor nuclides $^{224}$Ra and $^{228}$Th would have been measurable. Results: Highly purified $^{212}$Pb was collected in the collector subunit with a relevant yield of 65.6% (range 62.7-69.9% n=4) and with no measurable longer-lived precursor nuclides present (<0.5%). In conclusion: The assembly was effective in producing and collecting purified $^{212}$Pb in an easy manner without need for further purification.

Example 5B: Production of $^{212}$Pb with the $^{212}$Pb Precursor Isotope Source Absorbed on a Parafilm Strip The experiment from 5A was repeated except that a parafilm strip was used instead of paper a strip to carry the precursor isotope source.

Results: The yield of $^{212}Pb$ on the inner surfaces of the collector subunit (vial or container) was found to be only 19.3%. In contrast a unit with paper strip run in parallel with exact same configuration and emanation period gave a yield of 63.9%. In conclusion, the material used for absorbing and holding the $^{212}Pb$ precursor isotope source could greatly affect the yield of $^{212}Pb$ on the collector subunit or container.

Example 6: Dissolving of $^{212}Pb$ from the Container Using a Solution

Methods: The collector vial was added 0.3-0.5 ml 0.1 M HCl which was gently swirled to contact the inner surfaces with the liquid and counted in the Capintec dose calibrator. Thereafter the liquid was transferred to an Eppendorf tube and measured in the Capitec dose calibrator. The extraction yield was 74.0% (range 70.0-76.9%, n=3) when the collector subunit (3 ml v-vial), was washed one single time with 0.3 ml 0.1 M HCl. In conclusion, $^{212}Pb$ absorbed onto the surfaces of the container was rapidly and with good yield dissolved by a solution useful for radiopharmaceutical processing.

Example 7: Thin Layer Chromatography Analyses

Thin layer chromatography (TLC) was performed using chromatography strips (model #150-772, Biodex Medical Systems Inc, Shirley, NY, USA). A small beaker with about 0.5 ml of 0.9% NaCl was used to place strips with a sample spot in. To the strip was typically added 1-4 μl of sample at approximately 10% above the bottom of the strip. After the solvent front had moved to about 20% from the top of the strip, the strip was cut in half and each half was placed in a 5 ml test tube for counting. In this system radiolabeled antibody and free radionuclide does not migrate from the bottom half while radionuclide complexed with EDTA migrates to the upper half. A formulation buffer (FB) consisting of 7.5% human serum albumin and 1 mM EDTA in DPBS and adjusted to approximately pH 7 with NaOH was mixed with the radioconjugates in ratio 2:1 for at least 5 minutes before application to the strips to determine free radionuclide. It was verified that in a test solution with free $^{212}Pb$ was the radionuclide was completely (>99%) complexed by the EDTA, when mixed with FB, and would travel to the upper half of the TLC strip.

Example 8: In Situ Chelation of $^{212}Pb$ in Solutions

Background: The labeling properties of the $^{212}Pb$ extracted with 0.1 M HCl from the containers was evaluated. Methods: A 10:1 ratio of $^{212}Pb$ in 0.1 M HCl and 5 M ammonium acetate was used before addition of the chelators, resulting in a pH range of 5-6 for the reactions. Reaction times of 15-30 minutes at 37° C., were tested. For PSMA-617 solutions of 5 μg per 100 μl was labeled with good yield of 96.6% as determined by TLC. Also, TCMC-conjugated Herceptin antibody solution of approximately 1.0 mg/ml was labeled with pure $^{212}Pb$ with a good yield of 98.9%. In conclusion: Lead-212 produced with the assembly was readily complexed with small molecular and large molecular conjugates indicating suitability for use in production of $^{212}Pb$ based radiopharmaceuticals.

Example 9—Production of $^{212}Pb$ from the $^{224}Ra$ Source when Unit is Kept Sealed and Emptied Only at One Time Point Table 3, lower row, shows the example of an output from a diffusion generator emptied after various time points after insertion of the source of 100 MBq of $^{224}Ra$ into the unit. As shown the generator gives a relatively stable output of $^{212}Pb$ for up to 96 h.

Example 10—Production of $^{212}Pb$ from the $^{224}Ra$ Source when Unit is Emptied Once a Day for Four Days e.g. if Used for Fractionated Radionuclide Therapy Etc Table 4 shows the output when the assembly is "milked" once every 24 h. The combined output is a total of 151.5 MBq of $^{212}Pb$ when starting with a 100 MBq source. In conclusion, the one chamber assembly is suitable for single dose as well as fractionated dose production.

Figure 2A:
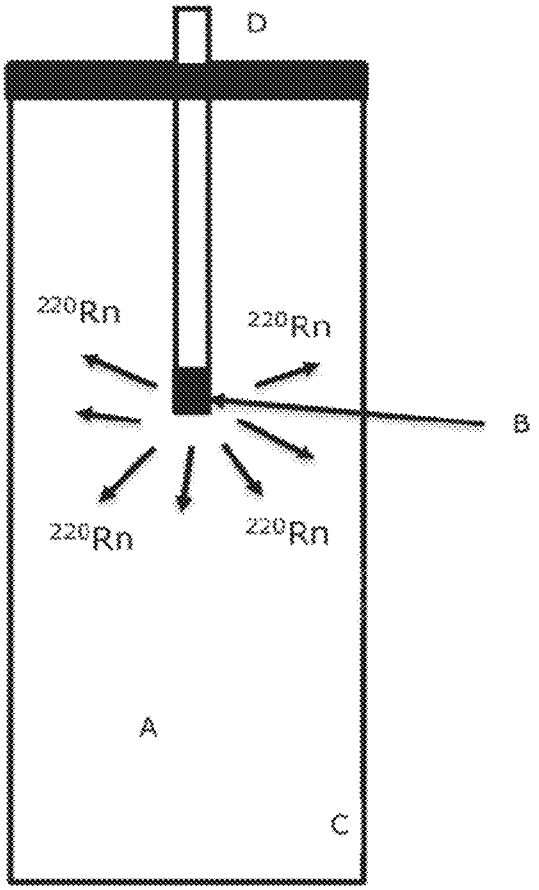
FIG. 2A shows a figure of the single chamber container assembly with the container (A), the $^{212}$Pb precursor isotope source (B) that generates the $^{220}$Rn gas which is released into the single chamber container assembly and after decay settled as $^{212}$Pb onto the inner walls of the container (C). The upper part of the single chamber container assembly (D) is the second part which comprises the $^{212}$Pb precursor isotope source and in this case a cover/cap with a rod attached pointing towards the centre of the container thus enabling $^{212}$Pb precursor isotope source release of $^{220}$Rn into the container.
Figure 2B:
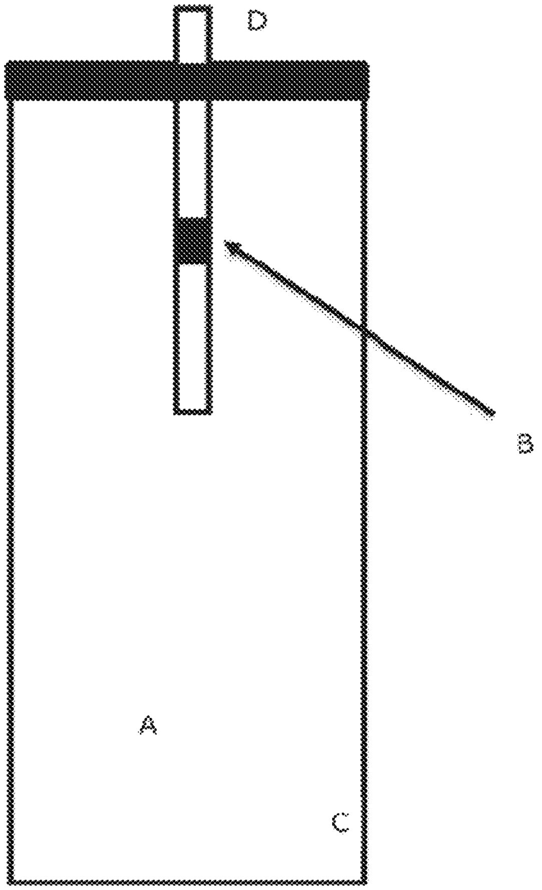
FIG. 2B shows a situation where the $^{212}$Pb precursor isotope source (B) has been withdrawn into a gas tight seal that ensures that no $^{220}$Rn is released into the container. The $^{212}$Pb precursor isotope source can also be removed entirely from the assembly.
Figure 4A:
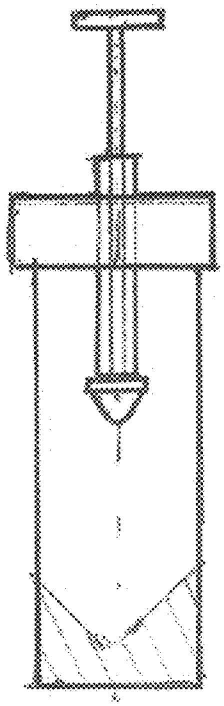
FIGS. 4A-4B. An example of a single chamber diffusion generator for $^{212}$Pb with a retractable source simplifying washout of $^{212}$Pb from the inner surfaces by having syringe permeable zones on the lid supplied with septum, a syringe could be used for washing of the interior surfaces without radionuclide cross contamination when the unit is put in closed position (FIG. 4B).
Figure 4B:
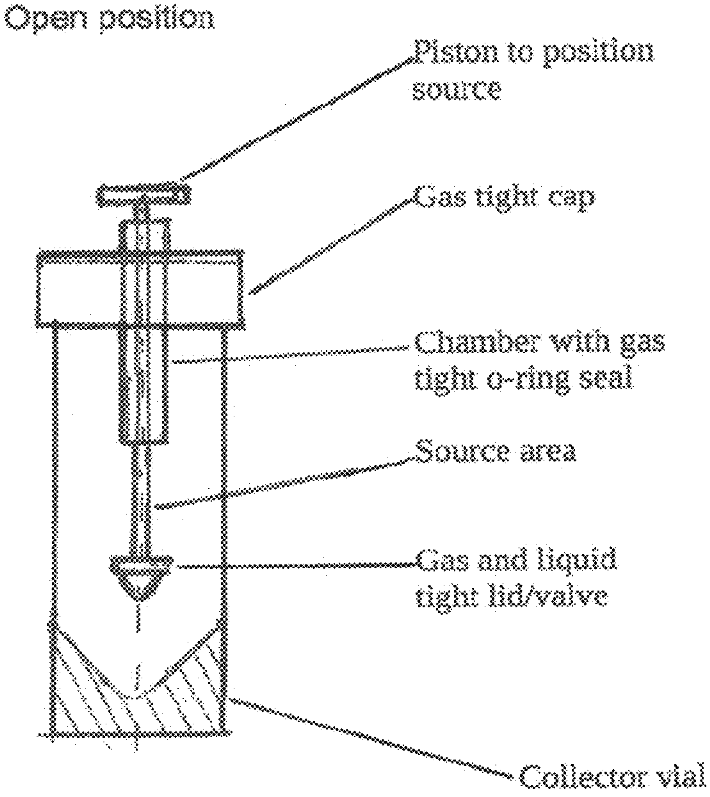

Example 11—Example of an Assembly with a Retractable Source (FIG. 2 and FIGS. 4A-4B)

The materials used may be of glass (including quartz), polymer, metal, ceramic or other suitable materials for pharmaceutical containers. The rod in FIG. 2 (piston in FIGS. 4A-4B) slides in a tube with o rings or similar at the top to secure gas tight seal. The valve at the bottom of the rod is gas and liquid tight in the closed position for the unit.

In the open position the source will be exposed inside the container and emanate $^{220}Rn$ and cause deposit of $^{212}Pb$ onto the inner surface. In closed position the source is sealed off from the container (FIG. 2B) and the container surfaces can be contacted with a suitable solution to dissolve $^{212}Pb$.

In one embodiment where the cap has syringe permeable membrane, a sterile syringe with a sterile solution is used to extract the $^{212}Pb$ without removing the cap. When such unit has been autoclaved before the extraction of $^{212}Pb$, the complete procedure can be performed in an aseptic/sterile fashion.

Figure 5A:
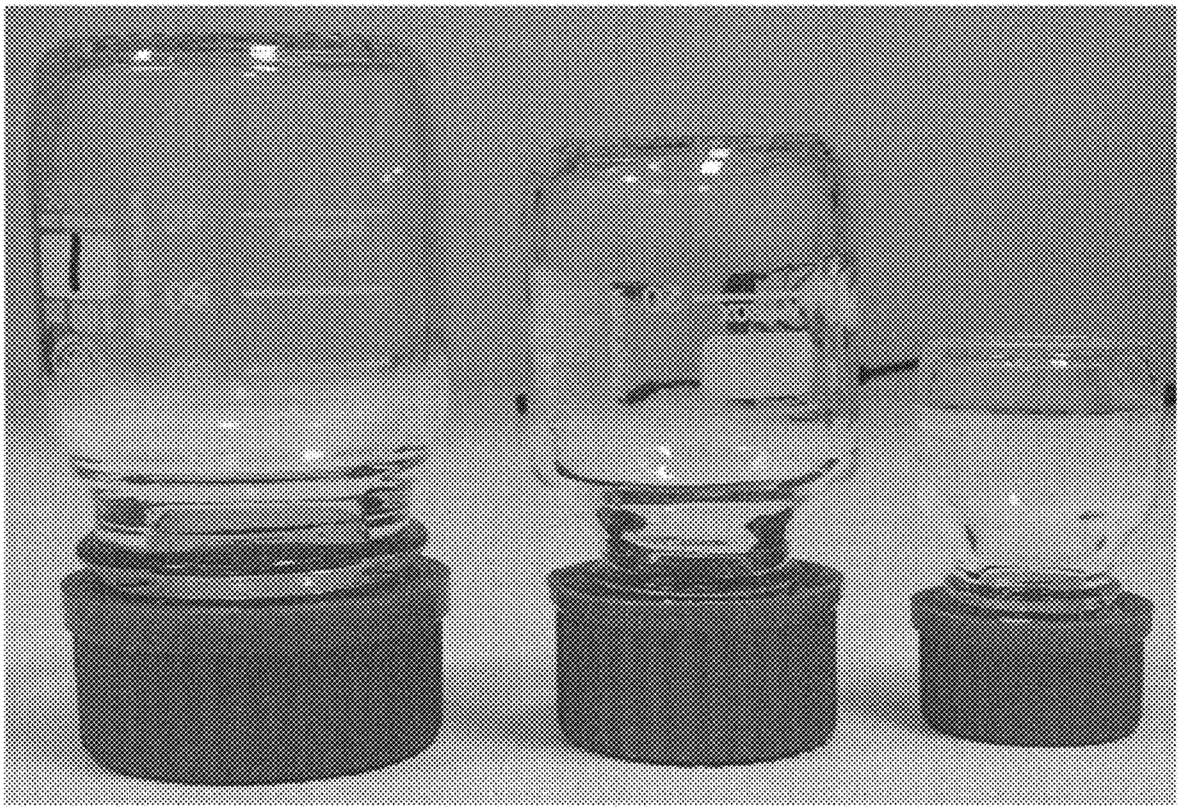
FIGS. 5A-5B.
Figure 5B:
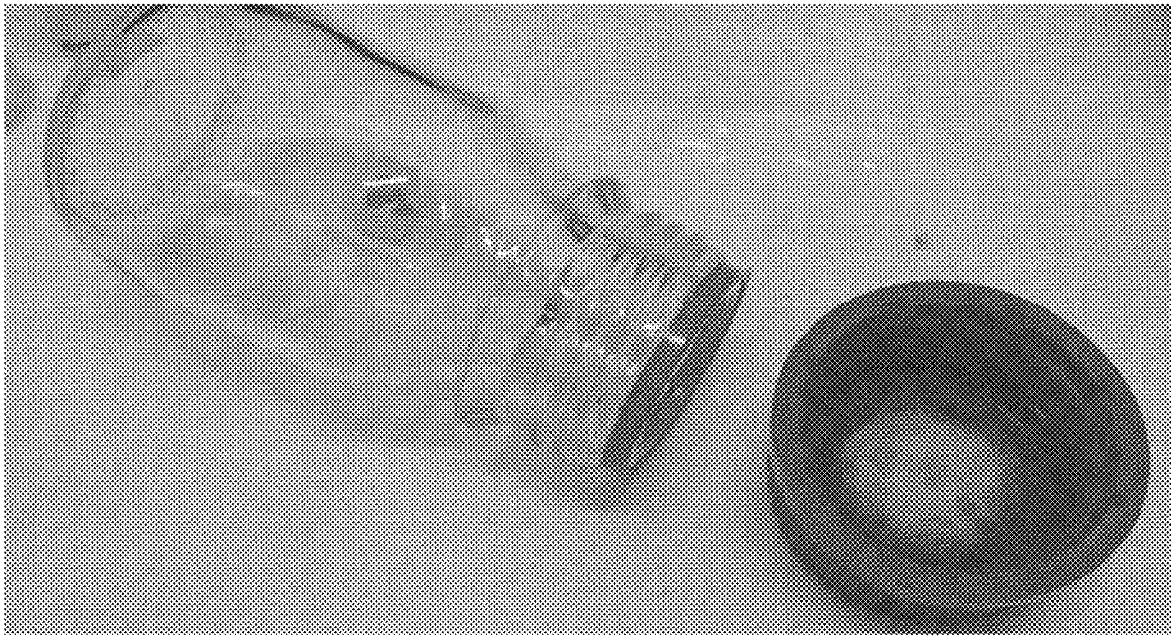

Example 12. Precursor Nuclide Placed onto Quartz Wool in a $^{212}Pb$ Single Chamber Generator Methods: A flask as shown in FIGS. 5A-5B, was used. Flask size could vary and typically 10-100 ml flasks were used. When used as a generator the flask was turned-up-side down. The cap was removed and inside of the center of the cap was placed quarts or glass wool. Radium-224 in solution was placed on the quartz wool and the flask was mounted onto the cap without touching the quartz wool with the flask. The unit was kept tight and stored in up-side-down position for a period of time to produce $^{212}Pb$ from ingrowth. After typical one to a few days the flask was unscrewed from the cap while being held up-side-down and carefully removed from the cap without touching the quartz wool. The cap with the source was combined with another flask and stored up side down for further $^{212}Pb$ production. The unscrewed $^{212}Pb$ containing flask was added a solution of 0.5-2 ml of 0.1 M HCl and the $^{212}Pb$ extracted from the flask by washing the interior surfaces and collected for use.

Results: Typically, 50-70 percent of the $^{212}Pb$ activity produced was found in the flask and by carefully washing more than 90% of the $^{212}Pb$ activity could be collected in the washing solution. The produced $^{212}Pb$ had a very high purity with $^{224}Ra$ being as low as 10-4 vs $^{212}Pb$ in newly extracted solutions. The product was very suitable for use in labeling of chelator-containing proteins and small molecules giving very high labeling yields, typically above 97%.

In conclusion, the data showed that quartz wool was very suitable for holding a $^{224}Ra$ source indicating that quartz/glass/mineral wool, metal wool etc would be suitable for this purpose. It would be possible to use the flask/quartz wool system in upright position also providing the quartz wool is adhered to the capsule, e.g. with glue, double-sided mounting tape etc. In the current example the flask was used up-side down and the quartz wool was not adhered, but just placed and kept by gravity in position inside the cap.

Example 13. Up-Side-Down Flask System Version of Single the Chamber Generator

Flask based diffusion generator for labeling with $^{212}$Pb.

Lead-212 generate therapeutic high-LET radiation as it decays via short-lived alpha emitting daughters resulting in an average of one alpha particle per $^{212}$Pb decay. The half-life of $^{212}$Pb of 10.6 hours is a limitation to its use and fast and safe production and purification procedures are required. If a ready to use product was to be produced in a centralized production facility and shipped to the end user, the activity level would be reduced to less than 25% in one day. Lead-212 based radioimmunoconjugate has been in clinical testing against peritoneal cancer using $^{212}$Pb separated from $^{224}$Ra in a cation exchange column and eluted in mineral acid which has to be reconstituted before radiolabeling. This method requires a significant work effort, facilities, and equipment suitable for evaporation of mineral acids etc to work up the $^{212}$Pb from the $^{224}$Ra generator material. An alternative generator method was developed and tested based on $^{224}$Ra absorbed onto quartz wool and placed inside the centered ring of a removable cap (the generator cap), in a generator chamber. The chamber consists of a glass bottle turned upside down and the removable cap supports the $^{224}$Ra labeled quartz wool (FIGS. 5A-5B). When $^{224}$Ra decays, the short-lived $^{220}$Rn emanates from the quartz wool and causes absorption of the longer-living decay product, $^{212}$Pb, onto the interior surfaces of the flask. The flask can be removed from the cap without the glass coming in contact with the quartz wool. After removing the flask from the generator cap, the flask can be rinsed on the inside with 0.1 M HCl to dissolve the $^{212}$Pb deposits whereby a highly purified $^{212}$Pb solution is made. The operation and washout of the generator flask is made prior to radiolabeling of NG001. The purity of $^{212}$Pb vs $^{224}$Ra in the solution is, when the generator is operated in a correct manner (i.e. that the source does not come into contact with the walls), better than 99.8%. The generator can be re-used by attaching a new glass bottle to the generator cap and store for typically 1-2 days for the generation of fresh $^{212}$Pb.

In summary, the generator method is easier to use and less time consuming compared with ion exchange-based generators. The generator may be re-used several times (although with a decreasing capacity due to radioactive decay depending of source half-life).

Example 14: Size of Collector Flask

The flask sizes of 10, 50 and 100 ml was tested (FIGS. 5A-5B, upper part). $^{224}$Ra was added to quarts wool placed in the cap of flasks placed upside down. The % $^{212}$Pb on the flask compared with the theoretical yield varied from about 40% to 60%. It tended to be an advantage to use a larger flask to cap inner surface volume to obtain high yield. In conclusion, flasks with various sizes could be used for generator purposes but a relatively large flask vs. cap seemed to improve $^{212}$Pb yield as relatively less would be lost due to absorption on the cap and the source material.

Example 15: Materials for Holding the Source

To hold the source material in place inside the generator, e.g., in the inner cap center, Steel wool, glass wool, quartz wool was tested with $^{224}$Ra sources. The materials are porous and fluffy and allows for diffusion. A volume of 100-150 microliter of $^{224}$Ra in 0.1 M HCl was deposited onto the materials placed inside the caps of 100 ml flasks. After standing for 2-3 days or more, 52-64% of the $^{212}$Pb compared to $^{224}$Ra present in the generator would have settled on the glass surfaces, so all the three materials would work. i.e., quartz wool averaged of 5 tests, 59.9% (range 52.1-64.4%), glass wool 54.9% and steel wool 64.1% for one test each as compared to $^{224}$Ra activity in the generator. In conclusion, several different materials could be used to hold the source in the one chamber diffusion generator.

Example 16: Sources

The radionuclides $^{224}$Ra and $^{228}$Th were used as sources inside the generators. The $^{224}$Ra-based generator could be used typically repeatedly up to a few weeks while the $^{228}$Th-based unit could be used repeatedly for several months and deliver $^{212}$Pb by simply switching the glass flask with an unused one and wash the first flask to produce a $^{212}$Pb solution. Yield was not significantly reduced with repeated use except for the decay of the generator radionuclide. As long as the sources are centered inside the cap to avoid contact with the glass bottle, and flasks and caps are kept dry, cross contamination from source to the glass flask was minimal. In conclusion, the single chamber diffusion unit could be used repeatedly for producing $^{212}$Pb with both $^{228}$Th and $^{224}$Ra as the sources. Lead-212 activity on the inner glass surfaces from $^{228}$Th a source was found to be on average 49.3% (range 40.9%-66.7%) from four tests.

Example 17: Preparation Including Heating

To heat up flask before mounting onto the cap with the source material could be a way to produce reduced pressure in the generator. The flask was heated to 90° C. in a heat chamber for at least 15 minutes and then the flask and cap was screwed tightly together to be gas tight. The generator unit was thereafter stored at room temperature causing reduced inner pressure. After 1-4 days the chamber was opened and the $^{212}$Pb activity on the glass flask was measured. The yield from four tests using $^{224}$Ra on quartz wool was on average 68.1% (range 60.5%-75.9%, indicating improved yield compared with previous data for normal pressure flasks (average 59.9%). In conclusion, reduced chamber pressure may improve the yield of $^{212}$Pb with the one chamber diffusion generator.

Example 18: Yield of $^{212}$Pb in the Washout Solution

A standard solution of 0.1 M HCl was used for extracting the $^{212}$Pb trapped on the inner glass surface of 100 ml flasks. The washing solution was carefully shaken and swirled to cover the inside of the flasks for about 2 minutes and then 80% of the volume was taken out and measured and compared with the total count of the flask before the washing procedure. It was assumed that the 80% volumes should be divided by 0.8 to determine the total activity in the liquid. With 0.6 ml about 85% was extracted and with 1 ml 93% was extracted with similar washing effort. From $^{224}$Ra based generator on average 86.1% (range 79.4%-93.4%) for 8 tests was extracted from the glass bottles. From $^{228}$Th based generator on average 86.5% (range 84.5%-88.5%) for two tests was extracted from the glass bottles. In conclusion, $^{212}Pb$ trapped on the inner glass surfaces in the generators are easily extracted with 0.1 M HCl.

Example 19. Radiolabeling Reactivity of Solutions

The TCMC-chelator-based molecule NG001 (Stenberg et al 2020) was used for testing $^{212}Pb$ labeling with the generator extracted $^{212}Pb$. Lead-212 in 0.1 M HCl was added sodium acetate to adjust pH to about 5.5. Thereafter, NG001 was added to 10-20 micrograms per ml. After 30 minutes reaction on 37° C. using a Thermomixer (Eppendorf, Germany), samples were withdrawn and thin layer chromatography (TLC) was performed by mixing the samples 1:2 with 1 mM EDTMP in 7.5% bovine serum albumin solution and let it stand for 5 minutes. Thereafter 1-5 microliter was applied onto a chromatography strip (model #150-772, Biodex) and eluted with 0.9% NaCl solution in a beaker. When the liquid front reached the top of the strip, it was cut in two halves, each placed in a tube and counted separately in a Packard Cobra II gamma counter (Packard Instruments Co Inc, USA). The data showed that after 3 hours the activity of the bottom half would make up typically >99% indicating almost quantitative yield. Blind test without the NG001 but all the other compounds would give less than 3% on the bottom half of the strip indicating good selectivity for the TLC test. In conclusion, the $^{212}Pb$ extracted from the generator flask showed excellent reactivity, indicating suitability for radiopharmaceutical use.

Example 20. Radiochemical Purity of Extracted Solutions

Lead-212 solutions were stored for 10 days or more and recounted for measuring $^{224}Ra$. The $^{224}Ra$ activity was decay corrected back to time 0. The $^{224}Ra$ vs $^{212}Pb$ was determined to be on average 0.045% (range 0.01%-0.13%). In conclusion, the $^{212}Pb$ produced from the generator had high radiochemical purity relevant for pharmaceutical use.

The invention claimed is:

1. A radioisotope generator comprising:

a solid precursor isotope source configured to emanate one or more gaseous progeny isotopes, the solid precursor isotope source comprising a precursor isotope; and wherein the solid precursor isotope source is configured to be fluidly coupled to a volume including a collector surface with a gas tight seal, and wherein the solid precursor isotope source and the collector surface are configured such that the one or more gaseous progeny isotopes deposit one or more solid progeny isotopes on the collector surface.

2. The radioisotope generator of claim 1, further comprising a flushing circuit configured to flush the collector surface.

3. The radioisotope generator of claim 1, further comprising a valve associated with the solid precursor isotope source.

4. The radioisotope generator of claim 1, further comprising a vacuum pump attached to the volume.

5. The radioisotope generator of claim 1, wherein the solid precursor isotope source comprises a porous material configured to retain the precursor isotope.

6. The radioisotope generator of claim 5, wherein the precursor isotope is absorbed, adsorbed, and/or encapsulated by the porous material.

7. The radioisotope generator of claim 1, wherein the precursor isotope comprises a thorium 228 isotope ($^{228}Th$) and/or a radium 224 isotope ($^{2224}Ra$), the one or more gaseous progeny isotopes comprises a radon 220 isotope ($^{220}Rn$), and the one or more solid progeny isotopes comprises a lead 212 isotope ($^{212}Pb$).

8. The radioisotope generator of claim 1, wherein the collector surface is an interior surface of a container, and wherein the volume is an internal volume of the container.

9. The radioisotope generator of claim 8, wherein the solid precursor isotope source is configured to be connected to an opening of the container.

10. The radioisotope generator of claim 8, further comprising the container.

11. The radioisotope generator of claim 10, wherein the container is configured to removably connect to the solid precursor isotope source.

12. The radioisotope generator of claim 10, further comprising a chelator disposed on the interior surface, the chelator configured to chelate the one or more solid progeny isotopes.

13. The radioisotope generator of claim 12, wherein the chelator comprises TCMC.

14. The radioisotope generator of claim 10, wherein the volume is configured to receive a solvent configured to dissolve the one or more solid progeny isotopes from the interior surface.

15. The radioisotope generator of claim 1, wherein the radioisotope generator is configured to be converted from a first configuration in which the collector surface is not in fluid communication with the solid precursor isotope source, and a second configuration in which the collector surface is in fluid communication with the solid precursor isotope source.

16. A method of generating a progeny radioisotope, the method comprising:

allowing one or more gaseous progeny isotopes to emanate from a solid precursor isotope source, the solid precursor isotope source comprising a precursor isotope;

fluidly coupling a volume including a collector surface to the solid precursor isotope source using a gas tight seal; and allowing one or more solid progeny isotopes of the one or more gaseous progeny isotopes to deposit on the collector surface.

17. The method of claim 16, further comprising flushing the collector surface.

18. The method of claim 16, wherein fluidly coupling the volume to the solid precursor isotope comprises opening a valve associated with the solid precursor isotope source.

19. The method of claim 16, further comprising drawing a vacuum in the volume.

20. The method of claim 16, wherein the solid precursor isotope source comprises a porous material configured to retain the precursor isotope.

21. The method of claim 20, wherein the precursor isotope is absorbed, adsorbed, and/or encapsulated by the porous material.

22. The method of claim 16, wherein the precursor isotope comprises a thorium 228 isotope ($^{228}Th$) and/or a radium 224 isotope ($^{224}Ra$), the one or more gaseous progeny isotopes comprises a radon 220 isotope ($^{220}Rn$), and the one or more solid progeny isotopes comprises a lead 212 isotope ($^{212}Pb$).

23. The method of claim 16, wherein the collector surface is an interior surface of a container, and wherein the volume is an internal volume of the container.

24. The method of claim 23, further comprising connecting the solid precursor isotope source to an opening of the container.

25. The method of claim 23, further comprising removably connecting the solid precursor isotope to the container.

26. The method of claim 23, further comprising chelating the one or more solid progeny isotopes using a chelator disposed on the interior surface.

27. The method of claim 26, wherein the chelator comprises TCMC.

28. The method of claim 23, further comprising receiving a solvent in the volume, and dissolving the one or more solid progeny isotopes from the interior surface in the solvent.

29. The method of claim 16, wherein fluidly coupling the volume to the solid precursor isotope source comprises converting a radioisotope generator from a first configuration in which the collector surface is not in fluid communication with the solid precursor isotope source to a second configuration in which the collector surface is in fluid communication with the solid precursor isotope source.

30. The method of claim 16, further comprising forming a radiopharmaceutical using the one or more solid progeny isotopes.

31. The method of claim 18, further comprising closing the valve to isolate the volume from the solid precursor isotope source.

32. The method of claim 16, wherein the solid precursor isotope is bound to a non-radioactive material.

33. The method of claim 32, wherein the non-radioactive material is a ceramic.

34. The method of claim 23, forming at least a portion of a single chamber with the solid precursor isotope source and the container.

35. The radioisotope generator of claim 3, wherein the valve is configured to isolate the solid precursor isotope from the volume in a closed position.

36. The radioisotope generator of claim 1, wherein the solid precursor isotope is bound to a non-radioactive material.

37. The radioisotope generator of claim 36, wherein the non-radioactive material is a ceramic.

38. The radioisotope generator of claim 10, wherein the solid precursor isotope source and the container form at least a portion of a single chamber when fluidly coupled.

* * * * *